US008376263B2

(12) United States Patent
Eames (10) Patent No.: US 8,376,263 B2
(45) Date of Patent: Feb. 19, 2013

(54) ROADABLE AIRCRAFT

(75) Inventor: David John Howard Eames, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 192 days.

(21) Appl. No.: 12/870,039

(22) Filed: Aug. 27, 2010

(65) Prior Publication Data
US 2012/0048989 A1   Mar. 1, 2012

(51) Int. Cl.
*B64C 27/22* (2006.01)
(52) U.S. Cl. ............... 244/2; 244/12.3; 244/56; 244/49
(58) Field of Classification Search ............ 244/12.1, 244/12.3–12.5, 23 B, 23 A, 2, 49, 56, 15
See application file for complete search history.

(56) References Cited

U.S. PATENT DOCUMENTS

| | | | |
|---|---|---|---|
| 3,131,873 A * | 5/1964 | Sanders | 244/12.3 |
| 3,361,386 A * | 1/1968 | Smith | 244/12.1 |
| 4,579,297 A | 4/1986 | Ayoola | |
| 5,505,407 A | 4/1996 | Chiappetta | |
| 5,823,468 A | 10/1998 | Bothe | |
| 6,082,665 A | 7/2000 | Spitzer | |
| 6,083,772 A | 7/2000 | Bowman et al. | |
| 6,086,014 A | 7/2000 | Bragg, Jr. | |
| 6,129,306 A | 10/2000 | Pham | |
| 6,131,848 A | 10/2000 | Crow | |
| 6,224,012 B1 | 5/2001 | Wooley | |
| 6,457,670 B1 | 10/2002 | Geranio et al. | |
| 6,517,026 B1 | 2/2003 | Smith | |
| 6,619,584 B1 | 9/2003 | Haynes | |
| 6,745,977 B1 | 6/2004 | Long et al. | |
| 6,786,450 B1 | 9/2004 | Einstein | |
| 6,824,095 B2 | 11/2004 | Mao | |
| 6,978,969 B1 | 12/2005 | Neal | |
| 7,300,019 B2 | 11/2007 | Preston | |
| 7,681,832 B2 | 3/2010 | Colclough | |
| 2005/0045762 A1* | 3/2005 | Pham | 244/7 R |
| 2008/0011897 A1* | 1/2008 | Xu | 244/2 |

* cited by examiner

*Primary Examiner* — Timothy D Collins
*Assistant Examiner* — Nicholas McFall
(74) *Attorney, Agent, or Firm* — Krieg DeVault LLP (57) ABSTRACT

A roadable aircraft and an associated method are disclosed herein. The roadable aircraft includes a body extending along a longitudinal axis and operable to house a human occupant. The roadable aircraft also includes at least first and second wings each being selectively moveable relative to the body between a retracted position for stowing and an extended position for flight. Each of the first and second wings extend a wing cord along the longitudinal axis when in the extended position between a leading edge and a wing trailing-edge vectoring nozzle. The roadable aircraft also includes a system for directing first and second streams of air through the first and second wings, respectively, and out of the first and second wing trailing-edge vectoring nozzles such that thrust for the body is generated. In addition, embodiments of the invention can include a plurality of deployable, vectoring lift fans which are also capable of producing thrust. Thrust for VTOL and cruise flight can be achieved by combining the thrust generated by the wing trailing-edge vectoring nozzles and/or the vectoring lift fans. An alternative to the wing trailing-edge vectoring nozzles would be to vector the entire wing.

30 Claims, 6 Drawing Sheets

ROADABLE AIRCRAFT

BACKGROUND OF THE INVENTION

1. Field of the Invention

The invention relates to machines or structures adapted to be completely or partially sustained by the air generally, and more specifically to compound aeronautical machines consisting of two or more complete machines of the same or different types acting together to provide a single result or to be mutually interdependent.

2. Description of Related Prior Art

U.S. Pat. No. 6,745,977 discloses a flying car. The flying car is a vehicle in the general shape of a land vehicle, such as a car, but has a plurality of rotors so the vehicle is capable of flight in the manner of a VTOL (vehicle capable of vertical take-off/landing) or a helicopter. The vehicle has foot pedals and steering that can be operated in the manner similar to that of a car.

SUMMARY OF THE INVENTION

In summary, the invention is a roadable aircraft and an associated method. The roadable aircraft includes a body extending along a longitudinal axis and operable to house human occupants. The roadable aircraft also includes at least first and second wings each being selectively moveable relative to the body between a retracted position for stowing and an extended position for flight. Each of the first and second wings extend a wing cord along the longitudinal axis when in the extended position between a leading edge and a wing trailing-edge vectoring nozzle. The roadable aircraft also includes a system for directing first and second streams of air through the first and second wings, respectively, and out of the first and second wing trailing-edge vectoring nozzles such that thrust for the body is generated. In addition, embodiments of the invention can include a plurality of deployable, vectoring lift fans which are also capable of producing thrust. Thrust for VTOL and cruise flight can be achieved by combining the thrust generated by the wing trailing-edge vectoring nozzles and/or the vectoring lift fans. An alternative to the wing trailing-edge vectoring nozzles would be to vector the entire wing.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF EXEMPLARY EMBODIMENTS

A plurality of different embodiments of the invention is shown in the Figures of the application. Similar features are shown in the various embodiments of the invention. Similar features have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

Figure 1:
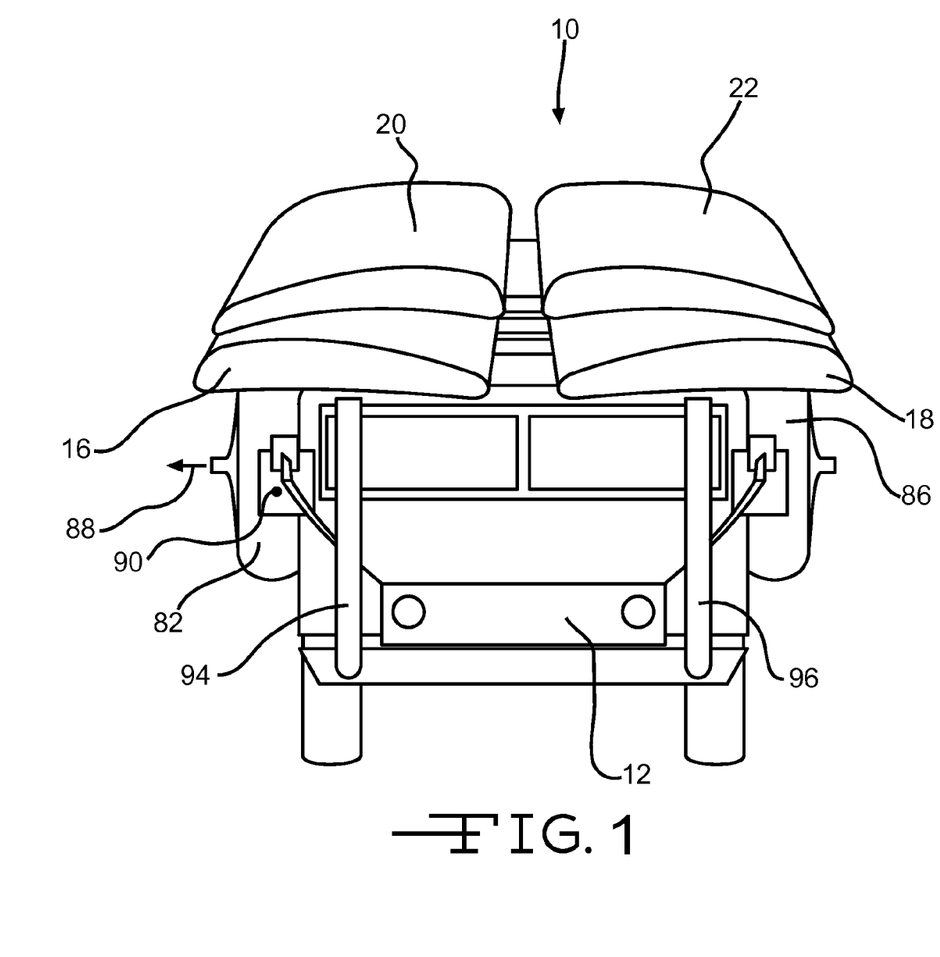
FIG. 1 is a perspective view of a front end of a roadable aircraft according to an exemplary embodiment of the invention.
Figure 6:
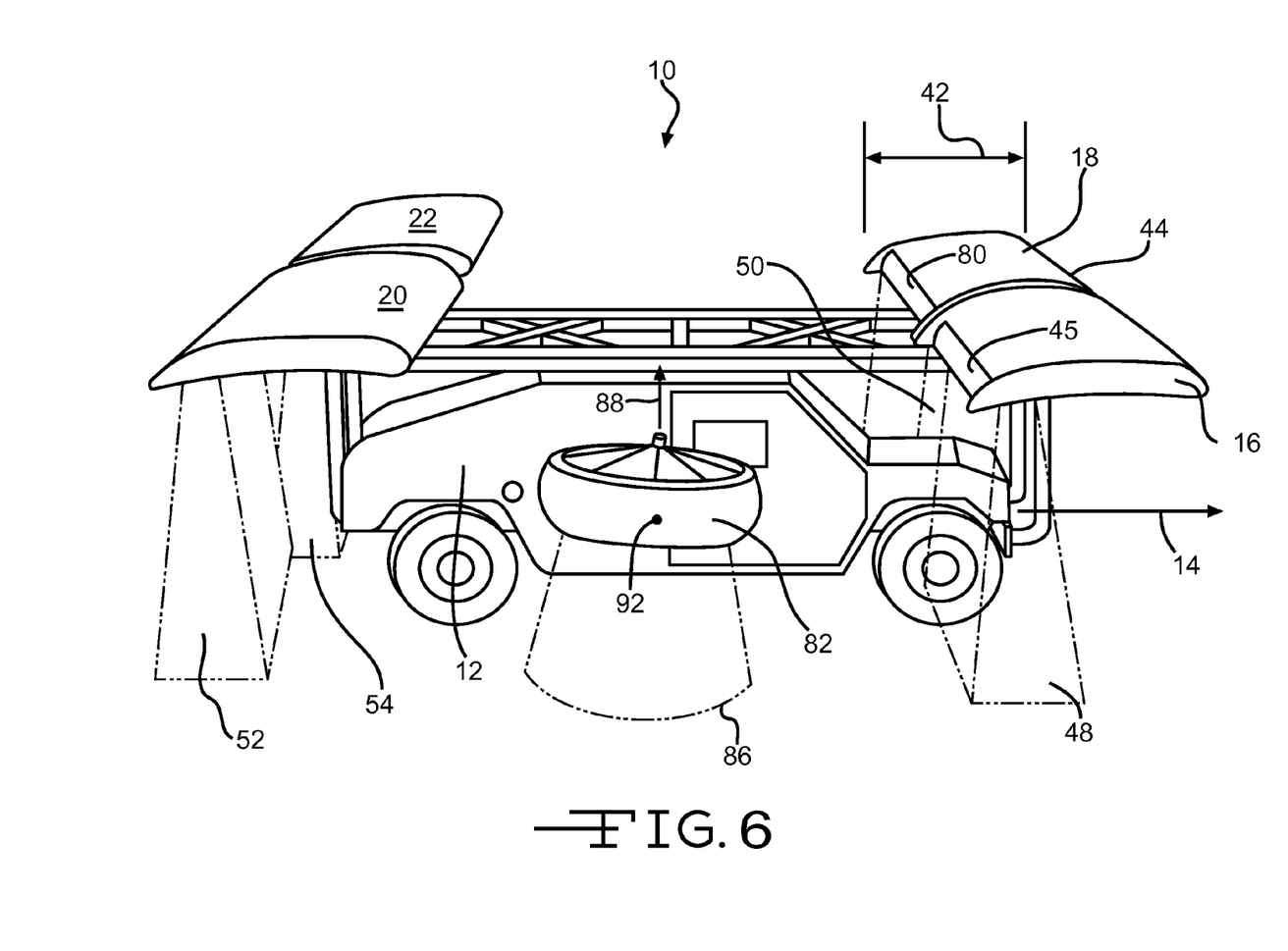
FIG. 6 is a perspective view of a first side of the roadable aircraft and shows vertical thrust being generated at a plurality of locations.

FIGS. 1 and 6 provide different views of a roadable aircraft 10 according to an embodiment of the invention. The roadable aircraft 10 includes a body 12 extending along a longitudinal axis 14. The body 12 is operable to house human occupants, one or more at a time. The body 12 can also be large enough to house the propulsion system, equipment, armaments, or other items.

The roadable aircraft 10 includes at least first and second wings 16, 18 each being selectively moveable relative to the body 12. FIG. 1 shows the first and second wings 16, 18 in a retracted position for stowing. The wings 16, 18 can pivot upon supporting beams 94, 96, respectively. FIG. 6 shows the first and second wings 16, 18 in an extended position for flight. In addition to the first pair of wings 16, 18, the exemplary embodiment can also include third and fourth wings 20, 22. The second pair of wings 20, 22 can be spaced from the first pair of wings 16, 18 along the longitudinal axis 14. Each of the wings 20, 22 can be selectively moveable relative to the body 12 between a retracted position for stowing and an extended position for flight.

Figure 2:
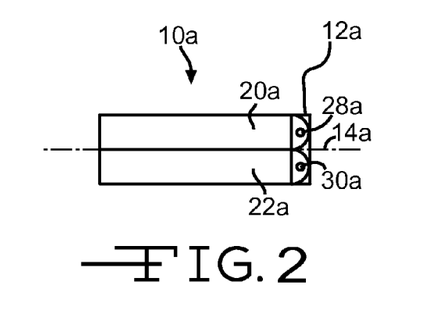
FIG. 2 is a schematic top view of an exemplary embodiment of the invention wherein wings are stowed in respective retracted positions.
Figure 3:
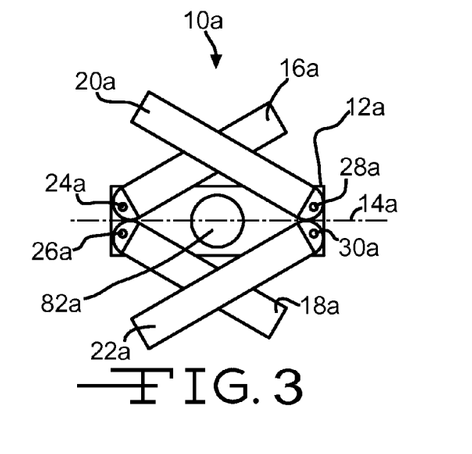
FIG. 3 is a schematic top view of the exemplary embodiment shown in FIG. 2 wherein the wings have been moved from the respective retracted positions towards respective extended positions.
Figure 4:
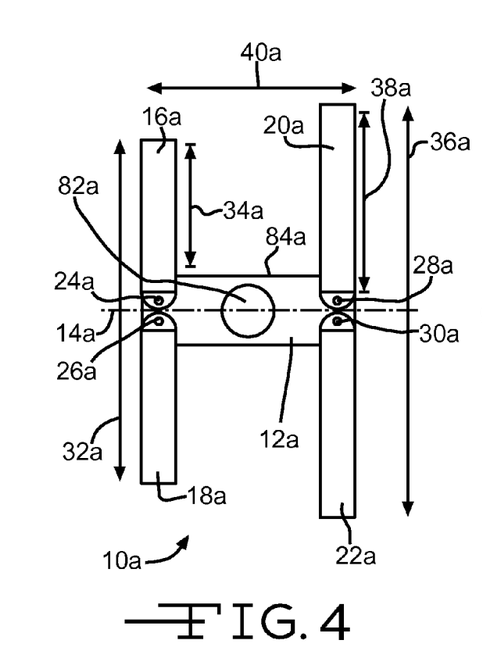
FIG. 4 is a schematic top view of the exemplary embodiment shown in FIGS. 2 and 3 wherein the wings are in respective extended positions and wherein the embodiment includes a single lift fan.

FIGS. 2-4 show one example of how the wings can be jointly or separately moved from respective stowed positions to respective extended positions. A roadable aircraft 10a can include wings 16a, 18a, 20a, 22a. In FIG. 2, the wings 16a and 18a are disposed under or over the wings 20a and 22a when the wings 16a, 18a, 20a, 22a are in respective stowed positions. The wing 16a can be pivoted about an axis 24a to move from the stowed position shown in FIG. 2 to the extended position shown in FIG. 4. The wing 18a can be pivoted about an axis 26a to move from the stowed position shown in FIG. 2 to the extended position shown in FIG. 4. The wing 20a can be pivoted about an axis 28a to move from the stowed position shown in FIG. 2 to the extended position shown in FIG. 4. The wing 22a can be pivoted about an axis 30a to move from the stowed position shown in FIG. 2 to the extended position shown in FIG. 4.

Referring again to FIG. 6, each of the wings 16, 18, 20, 22 extend a wing cord along the longitudinal axis 14 when in the extended position between a leading edge and a wing trailing-edge vectoring nozzle (VTN). For example, the wing 18 can extend a wing cord 42 along the longitudinal axis 14 when in the extended position between a leading edge 44 and a VTN 45. The VTN 45 includes an opening that is not visible in most of the Figures, but is visible in the schematic view of FIG. 7, referenced at 46b. The VTNs can extend substantially the full span of the respective wing.

The roadable aircraft 10 also includes a system for directing first and second streams of air through the VTNs of at least two of the wings 16, 18, 20, 22. In the exemplary embodiment, the system can direct respective airstreams through the VTNs of all four wings 16, 18, 20, 22. The airstreams are directed out of the openings of the VTNs such that thrust for the body 12 is generated. The air streams are referenced at 48, 50, 52, 54 in FIGS. 6 and 8.

Figure 5:
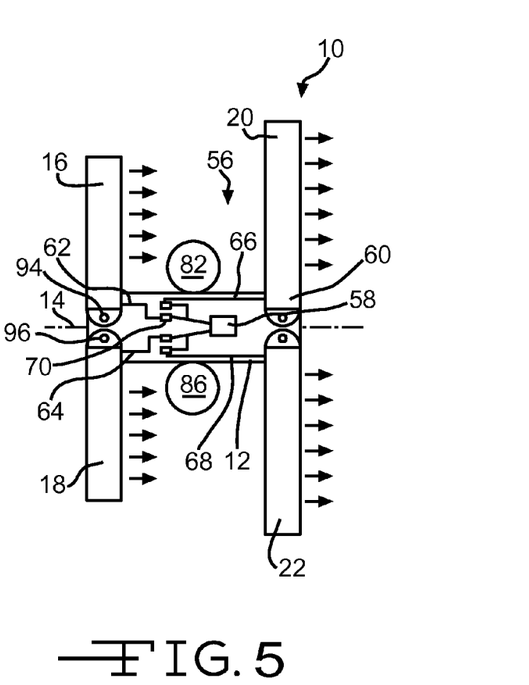
FIG. 5 is a schematic top view of an exemplary embodiment of the invention having a pair of fans mounted on opposite sides of the roadable aircraft.

In some embodiments of the invention, the system for directing the airstreams can include one more compressors. For example, as shown in FIG. 5, a system 56 can include a compressor 58 having an outlet 60. The outlet 60 can communicate with all of the wings 16, 18, 20, 22 through a substantially common fluid line or discrete fluid lines can extend from the outlet 60 to the wings 16, 18, 20, 22. In the exemplary embodiment, a fluid line 62 can extend to the wing 16, a fluid line 64 can extend to the wing 18, a fluid line 66 can extend to the wing 20, and a fluid line 68 can extend to the wing 22. The mass flow rate of the airstreams can be varied by positioning valves along one or more of the fluid lines 62, 64, 66, 68. For example, a valve 70 can be controlled by a controller to increase the flow rate of the airstream, decrease the flow rate, cease or start the flow. Valves disposed along all of the fluid lines 62, 64, 66, 68 can be jointly controlled by a common controller so that the respective airstreams can be controlled to vary the total thrust, pitch, roll, and yaw of the body 12 during flight.

Figure 7:
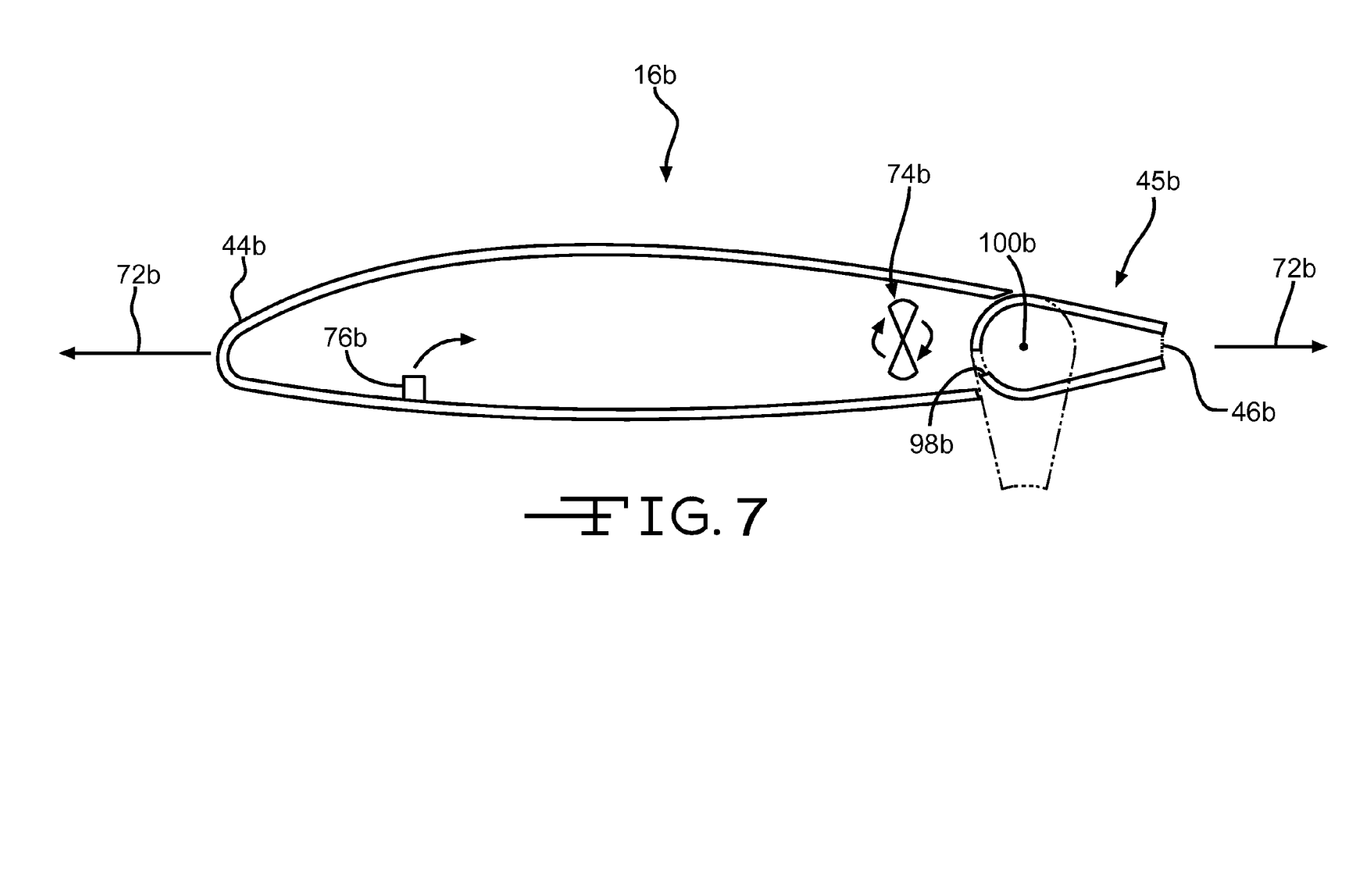
FIG. 7 is a schematic cross-section of a wing according to an embodiment of the invention.

In some embodiments of the invention, the system for directing the airstreams can include a plurality of fans mounted to or in the wings 16, 18, 20, 22. FIG. 7 schematically shows an example of such an embodiment. In FIG. 7, a wing 16b extends a distance of a wing cord along an axis 72b (parallel to a body axis such as axis 14) between a leading edge 44b and a VTN 45b. In the interior of the wing 16b, a plurality of fans such as fan 74b can be positioned along the span of the wing 16b (the span extends into the Figure) to direct air into the VTN 45b, such as through an opening 98b. A source of air referenced at 76b can communicate with the interior of the wing 16b and the fan 74b can direct the airstream out of the opening 46b. The fans could be independently powered by electric motors or other means. It is again noted that the view of FIG. 7 is schematic; the structures for directing air from the interior of the wing 16b and into the VTN 45b can be different than the open 98b.

Figure 8:
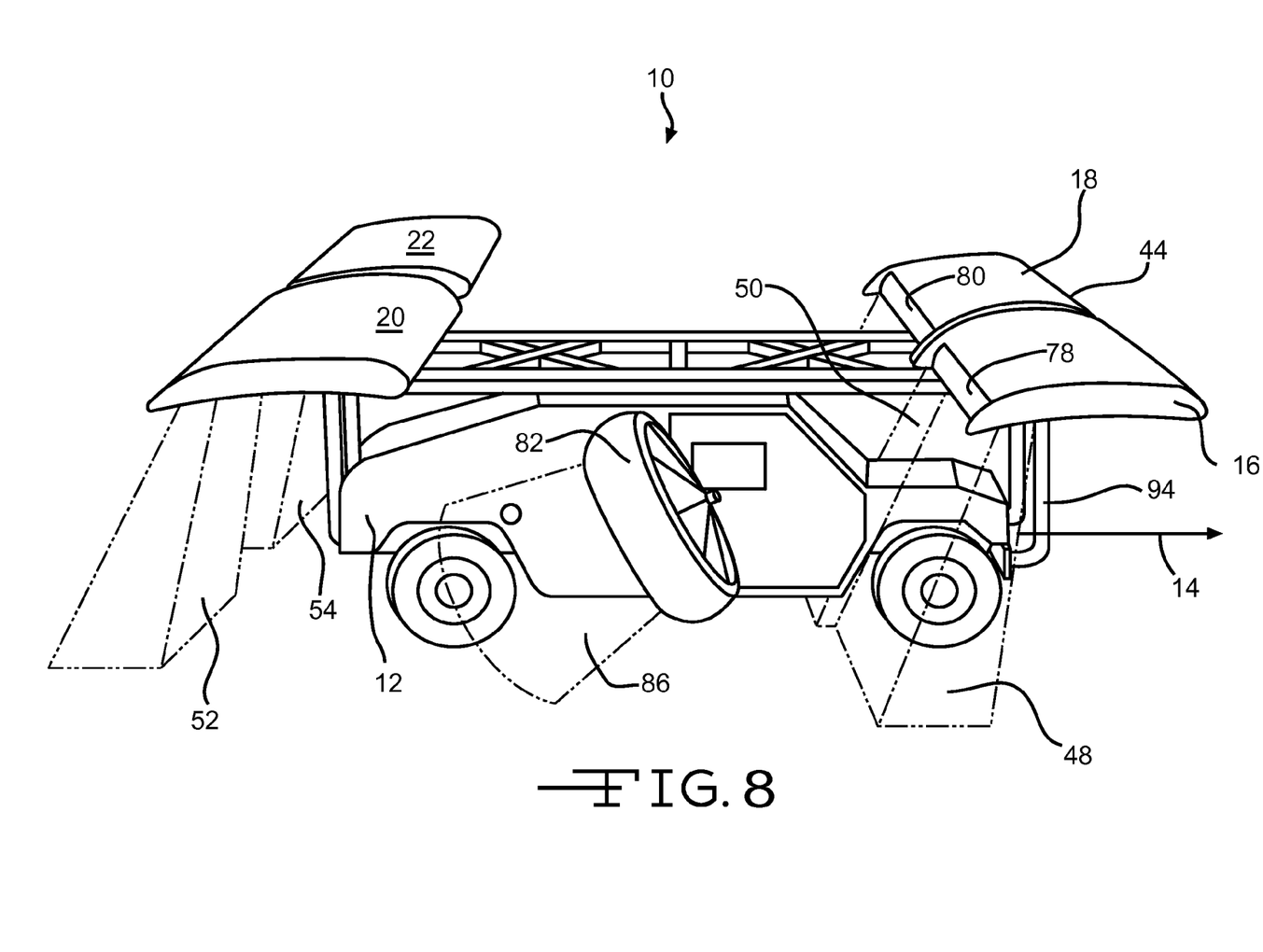
FIG. 8 is a perspective view of the first side of the roadable aircraft as shown in FIG. 6 and shows thrust vectoring having been changes to be partially vertical and partially horizontal.

Referring again to FIGS. 6 and 8, the VTNs can be moveable to vary the direction of the flow of the airstreams. Thrust is controlled by regulating the air flow to each VTN and the position/orientation of each VTN. For example, VTNs 45 and 80 can be individually mounted on the first and second wings 16, 18 respectively. Each of the first and second VTNs 45 and 80 can be pivotally moveable between a first position in which air streams exiting the VTNs are diverted downwardly to generate vertical thrust and a second position in which air streams exiting the VTNs flow substantially parallel to the longitudinal axis 14 to generate horizontal thrust. "Downwardly" can refer to the vector along which the airstream travels being substantially or fully normal to the axis 14. In FIG. 6 the VTNs 45 and 80 are shown in respective exemplary first positions. In FIG. 8 the VTNs 45 and 80 are shown in respective positions between exemplary first positions and exemplary second positions.

FIG. 7 shows a VTN 45b in two positions that can correspond to end limits of pivoting movement about a pivoting axis 100b. In solid line, the VTN 45b is shown in an exemplary first position corresponding to cruise mode of the roadable aircraft. An exemplary second position of the VTN 45b is shown in phantom. The exemplary second position of the VTN 45b corresponds to lift or take-off mode. It is noted that the VTN 45b can be capable of operating such that the flow of thrust fluid can be directed normal (downward) to the axis 72b. It is noted that a VTN according to various embodiments of the invention can be defined by an opening formed directly in the wing and flap positioned on the wing and also by a wing having an aft slot wherein the wing itself is capable of being vectored (rotated) about an axis perpendicular to the wing cord and generally parallel to the wing span.

The thrust generated through the VTNs can be supplemented with at least one fan mounted on the body. FIGS. 2-4 show an embodiment with a fan 82a disposed to provide vertical lift to the body 12a. The fan 82a is spaced from the first and second wings 16a, 18a along the axis 14a when the first and second wings 12a, 14a are in the extended position. The fan 82a can be positioned within the envelope of the body 12a. The envelope of the outer body 12a is the outer perimeter 84a of the body 12a.

FIGS. 1, 5, 6, and 8 show an embodiment with first and second fans 82, 86 positioned on opposite sides of the body 12. Each of the fans 82, 86 can be mounted to the body 12 with a gimbal. A gimbal is a contrivance, consisting of a ring or base on an axis, that permits an object mounted in or on it to tilt freely in any direction. For example, as shown in FIG. 1, the fans 82, 86 can be positioned in respective retracted positions for stowing when not in use. FIGS. 5, 6, and 8 show the fans 82, 86 in respective extended positions for flight. The gimbal arrangement, for example, can allow a centerline axis 88 of the fan 82 to rotate about an axis 90 (extending out of the page in FIG. 1) and rotate about a second axis perpendicular to the axis 90. This second axis is referenced at 92 in FIG. 6 and extends out of the page in FIG. 6. The fans 82, 86 can be operable to generate thrust for the body 12 and can be positioned along the longitudinal axis 14 between the first and second pairs of wings 16, 18 and 20, 22. The fans are 82, 86 can be spaced from the wings 16, 18, 20, 22 along the longitudinal axis 14 when the wings 16, 18, 20, 22 are in the respective extended positions.

For takeoff, the wings 16, 18, 20, 22 can be moved from respective stowed positions to respective extended positions. Also, the fans 82, 86 can be moved from respective stowed positions to respective extended positions. FIG. 6 shows the positions of the wings 16, 18, 20, 22 and fan 82 during takeoff. The fan 86 (not visible) is in a position similar to the fan 86. Airstreams can be directed through the VTNs in the wings 16, 18, 20, 22 as the respective flaps of the wings 16, 18, 20, 22 are in the first position. In addition, the fans 82, 86 can be engaged to generate airstreams providing thrust to the body 12. The airstream from fan 82 is referenced at 86.

Once airborne, the flaps of the wings 16, 18, 20, 22 and the fans 82, 86 can be controlled in unison to gradually provide the forward thrust component required until the wings 16, 18, 20, 22 could fully support the vehicle in forward flight. For example, the orientations of the flaps of the wings 16, 18, 20, 22 and the fans 82, 86 can be changed, as shown by a comparison of FIGS. 6 and 8.

Once the body 12 is established in cruise, the flow rate through one or more of the VTNs of the wings 16, 18, 20, 22 could be shut down or reduced to the extent that flight can be maintained. Alternatively, the rate of rotation of the fans 82, 86 could be reduced or stopped and the fans 82, 86 could be stowed against the sides of the body 12. Also, pitch, roll and yaw control could be achieved by varying the flow rates of the airstreams through the VTNs and the positions of the flaps. Pitch, roll and yaw control can also be exercised by shifting the positions of the fans 82, 86 relative to the axes (such as axes 90, 92) and/or by varying the rotational speed of the fans 82, 86 relative to one another. Landing of the body 12 can be accomplished by applying the steps set forth above in reverse order.

Numeric values for an exemplary embodiment of the invention are set forth below. These numeric values are for illustration only and are not limiting to the invention. The numeric values provided herein can be helpful for developing exemplary embodiments of the invention when considered relative to one another. For example, the numeric values may represent a relatively small embodiment of the invention. In a relatively large embodiment of the invention, one or more of the numeric values provided herein may be multiplied as desired. Also, different operating environments for one or more embodiments of the invention may dictate different relative numeric values.

EXAMPLE 1

Figure 9:
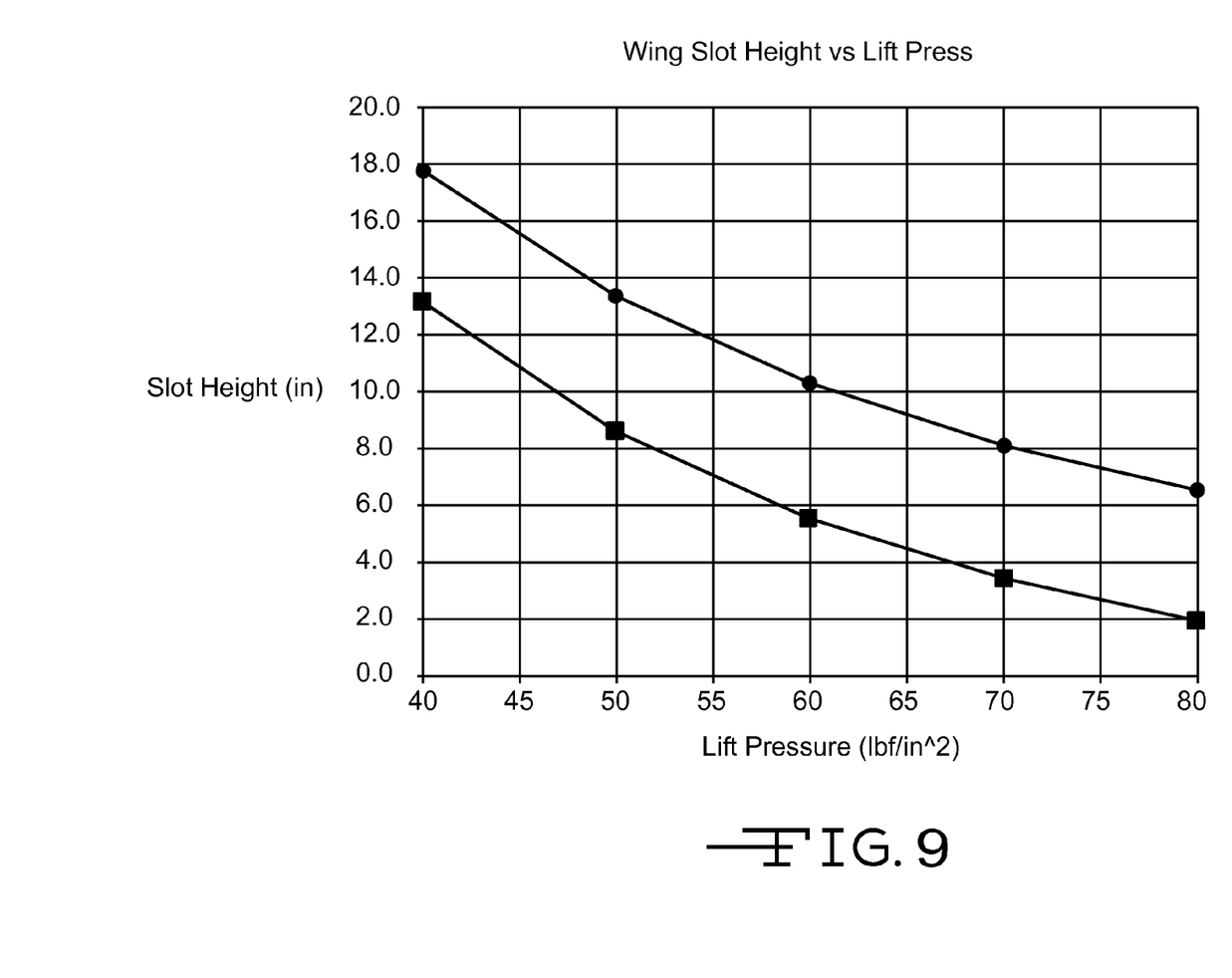
FIG. 9 is a graph that provides exemplary data for sizing openings of wing trailing-edge vectoring nozzles for possible embodiments of the invention relative to the exit air pressure substantially immediately downstream of the wing trailing-edge vectoring nozzles.

The body of an embodiment of the invention can weigh 4500 pounds. A desirable amount of lift force can be 5400 pounds. With reference to FIG. 4, the span of the front or first pair of wings 16*a*, 18*a* is referenced at 32*a* and can be 40 feet. The available length for the VTNs of the front wings 16*a*, 18*a* is referenced at 34*a* and can be 16 feet (a total of 32 feet of VTN length for the front wings 16*a*, 18*a*). The span of the aft or second pair of wings 20*a*, 22*a* is referenced at 36*a* and can be 48 feet. The available length for the VTNs of the aft wings 20*a*, 22*a* is referenced at 38*a* and can be 20 feet (a total of 40 feet of VTN length for the front wings 20*a*, 22*a*). The length of the embodiment is referenced at 40*a* and can be 24 feet. These dimensions can also apply to embodiment shown in FIG. 5. FIG. 9 is a graph that provides exemplary data for sizing the VTNs in view of the airstream pressure substantially immediately downstream of the VTNs. The higher curve applies to a single fan embodiment such as shown in FIGS. 2-4. The lower curve applies to a double fan embodiment such as shown in FIGS. 1, 5, 6, and 8.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A roadable aircraft comprising:
   a body extending along a longitudinal axis and adapted to house human occupants;
   at least first and second wings each being selectively moveable relative to said body between a retracted position for stowing and an extended position for flight, each of said first and second wings extending a wing cord along said longitudinal axis when in said extended position between a leading edge and a wing trailing-edge vectoring nozzle, said first and second wings each have a longitudinal wing span extending generally along said longitudinal axis when in said retracted position and which do not overlap one another when in said extended position; and
   a system for directing first and second streams of air through said first and second wings, respectively, and out of said first and second wing trailing-edge vectoring nozzles such that thrust for said body is generated.

2. The roadable aircraft of claim 1 wherein each of said first and second wings extend a span normal to said wing cord and wherein said respective wing trailing-edge vectoring nozzles extend substantially the full span of each of said first and second wings.

3. The roadable aircraft of claim 1 wherein said system further comprises:
   a compressor having an outlet;
   a plurality of fluid lines each extending between said outlet and one of said first and second wings.

4. The roadable aircraft of claim 1 wherein said system further comprises:
   a plurality of fans mounted to said first and second wings.

5. The roadable aircraft of claim 1 wherein each of said wing trailing-edge vectoring nozzles is pivotally moveable between a first position in which air streams exiting said wing trailing-edge vectoring nozzles are diverted downwardly to generate vertical thrust and a second position in which air streams exiting said wing trailing-edge vectoring nozzles flow substantially parallel to said longitudinal axis to generate horizontal thrust.

6. The roadable aircraft of claim 1 further comprising:
   at least one fan disposed to provide vertical lift to said body, wherein said at least one fan is spaced from said first and second wings.

7. The roadable aircraft of claim 6 wherein said at least one fan is spaced from said first and second wings along said longitudinal axis when said first and second wings are in said extended position.

8. The roadable aircraft of claim 6 wherein said at least one fan is mounted to said body with a gimbal.

9. The roadable aircraft of claim 8 wherein said at least one fan is further defined as first and second fans positioned on opposite sides of said body and each mounted to said body with a gimbal.

10. The roadable aircraft of claim 9 wherein said first and second fans are spaced from said first and second wings along said longitudinal axis when said first and second wings are in said extended position.

11. A method comprising the steps of:
    extending a body adapted to house a human occupant along a longitudinal axis;
    selectively moving at least first and second wings relative to said body between a retracted position for stowing and an extended position for flight, each of said first and second wings extending a wing cord along said longitudinal axis when in said extended position between a leading edge and a wing trailing-edge vectoring nozzle, said first and second wings each have a longitudinal wing span extending generally along said longitudinal axis when in said retracted position and which do not overlap one another when in said extended position; and directing first and second streams of air through said first and second wings, respectively, and out of said first and second wing trailing-edge vectoring nozzles with an air-moving system such that thrust for said body is generated.

12. The method of claim 11 further comprising the step of: pivoting said wing trailing-edge vectoring nozzles to vary the direction of thrust acting on the body.

13. The method of claim 11 further comprising the step of: supplementing the thrust generated by the first and second air streams with at least one fan mounted on the body, wherein the at least one fan is offset from the first and second wings along the longitudinal axis and does not overlap any portion of the first and second wings when the first and second wings are in the extended position.

14. The method of claim 13 further comprising the step of: supplementing the thrust generated by the first and second air streams with at least one fan mounted on the body, wherein the at least one fan is positioned entirely within an envelope defining an outer perimeter of the body.

15. The method of claim 14 further comprising the steps of: mounting the at least one fan with a gimbal; and
rotating the at least one fan about at least one axis to change one of the pitch, roll, and yaw of the body.

16. The method of claim 13 further comprising the step of: mounting the at least one fan to the body such that the fan is moveable between a retracted position for stowing and an extended position for flight.

17. The method of claim 13 wherein said supplementing step is further defined as supplementing the thrust generated by the first and second air streams with first and second fans mounted on the body and the method further comprises the step of:
varying the rotational speed of the first and second fans relative to one another to change one of the pitch, roll, and yaw of the body.

18. The method of claim 11 further comprising the step of: varying the flow rate of the first and second air streams relative to one another to change one of the pitch, roll, and yaw of the body.

19. A roadable aircraft comprising:
a body extending along a longitudinal axis and adapted to house a human occupant;
a first pair of wings each being selectively moveable relative to said body between a retracted position for stowing and an extended position for flight, each extending a wing cord along said longitudinal axis when in said extended position between a leading edge and a wing trailing-edge vectoring nozzle;
a second pair of wings spaced from said first pair of wings along said longitudinal axis, each being selectively moveable relative to said body between a retracted position for stowing and an extended position for flight and each extending a wing cord along said longitudinal axis when in said extended position between a leading edge and a wing trailing-edge vectoring nozzle;
a system for directing a plurality of air streams through said first and second pairs of wings and out of said wing trailing-edge vectoring nozzles such that thrust for said body is generated; and
at least one fan operable to generate vertical thrust positioned along the longitudinal axis between said first and second pairs of wings.

20. The roadable aircraft of claim 19 wherein said at least one fan is further defined as first and second fans mounted on opposite sides of said body through gimbals.

21. The roadable aircraft of claim 1 wherein said first and second wings have a length extending generally along said longitudinal axis when in said retracted position.

22. A roadable aircraft comprising:
a body extending along a longitudinal axis and adapted to house human occupants;
first and second pairs of wings that are each selectively moveable relative to said body between a retracted position for stowing and an extended position for flight, said first and second pairs of wings spaced from one another along said longitudinal axis, each of said wings extending a wing cord along said longitudinal axis when in said extended position between a leading edge and a wing trailing-edge vectoring nozzle; and
a system that directs an air stream through each of said first and second pairs of wings and out of said wing trailing-edge vectoring nozzles to generate thrust for said body.

23. The roadable aircraft of claim 22 wherein each of said wings of said first and second pairs of wings are arranged generally parallel with one another in said retracted position and are arranged generally parallel with one another in said extended position.

24. The roadable aircraft of claim 22 further comprising at least one fan attached to said body to provide vertical lift to said body.

25. The roadable aircraft of claim 24 wherein said at least one fan is positioned beneath said first and second pairs of wings when said first and second pairs of wings are in said extended position.

26. The roadable aircraft of claim 24 wherein said at least one fan does not overlap any portion of said first and second pairs of wings when said first and second pairs of wings are in said extended position.

27. A roadable aircraft comprising:
a body extending along a longitudinal axis and adapted to house human occupants;
at least first and second wings each being selectively moveable relative to said body between a retracted position for stowing and an extended position for flight, each of said first and second wings extending a wing cord along said longitudinal axis when in said extended position between a leading edge and a wing trailing-edge vectoring nozzle;
a system for directing first and second streams of air through said first and second wings, respectively, and out of said first and second wing trailing-edge vectoring nozzles such that thrust for said body is generated; and
at least one fan disposed to provide vertical lift to said body, wherein said at least one fan is spaced from said first and second wings, wherein said at least one fan is positioned beneath said first and second wings when said first and second wings are in said extended position.

28. The roadable aircraft of claim 27 wherein said at least one fan is further defined as first and second fans mounted on opposite sides of said longitudinal axis of said body; and
wherein said first and second fans are each positioned beneath said first and second wings when said first and second wings are in said extended position.

29. A roadable aircraft comprising:
a body extending along a longitudinal axis and adapted to house human occupants;

at least first and second wings each being selectively moveable relative to said body between a retracted position for stowing and an extended position for flight, each of said first and second wings extending a wing cord along said longitudinal axis when in said extended position between a leading edge and a wing trailing-edge vectoring nozzle;

a system for directing first and second streams of air through said first and second wings, respectively, and out of said first and second wing trailing-edge vectoring nozzles such that thrust for said body is generated; and at least one fan disposed to provide vertical lift to said body, wherein said at least one fan is spaced from said first and second wings, wherein said at least one fan does not overlap any portion of said first and second wings when said first and second wings are in said extended position.

30. A roadable aircraft comprising:

a body extending along a longitudinal axis and adapted to house human occupants;

at least first and second wings each being selectively moveable relative to said body between a retracted position for stowing and an extended position for flight, each of said first and second wings extending a wing cord along said longitudinal axis when in said extended position between a leading edge and a wing trailing-edge vectoring nozzle;

a system for directing first and second streams of air through said first and second wings, respectively, and out of said first and second wing trailing-edge vectoring nozzles such that thrust for said body is generated; and at least one fan disposed to provide vertical lift to said body, wherein said at least one fan is spaced from said first and second wings, wherein said at least one fan is positioned entirely within an outer perimeter of said body.

* * * * *